No. 611,272. Patented Sept. 27, 1898.
M. & T. W. PRIOR.
TIRE.
(Application filed Apr. 26, 1898.)

(No Model.)

Witnesses:
A. C. Harwood
James H. Urquhart

Inventors
Thomas W. Prior
Matthew Prior
by Crosby Gregory
attys.

THE NORRIS PETERS CO., PHOTO-LITHO., WASHINGTON, D. C.

UNITED STATES PATENT OFFICE.

MATTHEW PRIOR, OF WATERTOWN, MASSACHUSETTS, AND THOMAS W. PRIOR, OF PHILADELPHIA, PENNSYLVANIA, ASSIGNORS TO PRIOR COTTON GIN CO., OF PHILADELPHIA, PENNSYLVANIA.

TIRE.

SPECIFICATION forming part of Letters Patent No. 611,272, dated September 27, 1898.

Application filed April 26, 1898. Serial No. 679,178. (No model.)

*To all whom it may concern:*

Be it known that we, MATTHEW PRIOR, of Watertown, in the county of Middlesex and State of Massachusetts, and THOMAS W. PRIOR, of Philadelphia, in the county of Philadelphia and State of Pennsylvania, have invented an Improvement in Tires, of which the following description, in connection with the accompanying drawings, is a specification, like letters on the drawings representing like parts.

Our invention is an improvement in tubular fabric particularly adapted for bicycle-tires, and has for its object the production of a tire which obviates the disadvantages in the present pneumatic tire and produces a tire which is exceedingly strong and tough, being inherently resilient and at the same time thin and light and provided with a tread-surface which is not only hard, durable, and permanent, but not liable to slip on a smooth pavement.

Further advantages and details of construction of our invention will be pointed out in the course of the following description, reference being had to the accompanying drawings, illustrative of a preferred embodiment thereof, and the invention will be more particularly defined in the appended claims.

Figure 1:
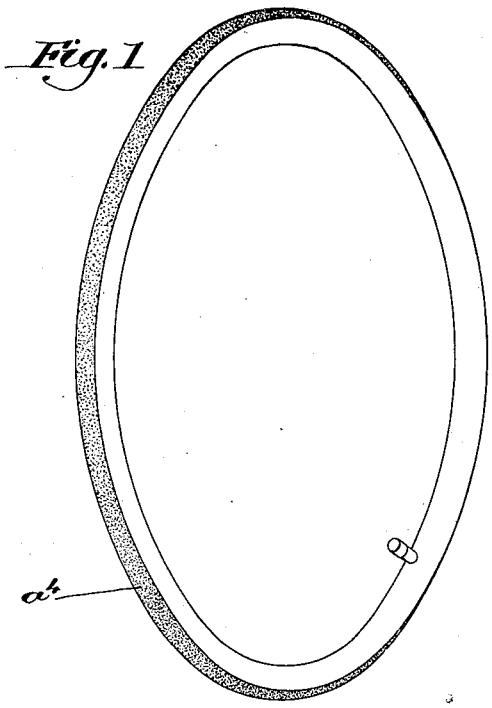
Figure 2:
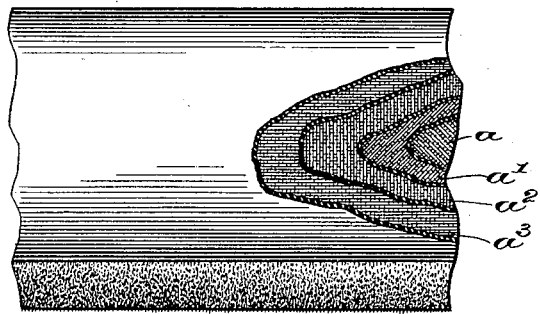
Figure 3:
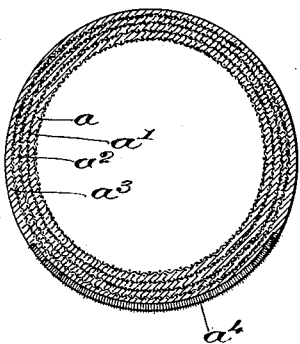
Figure 4:
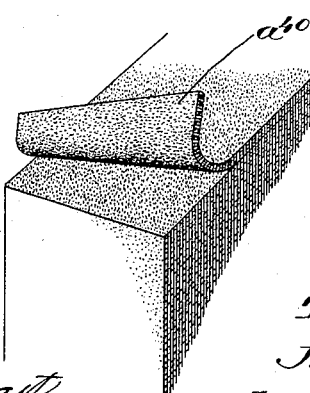

In the drawings, Figure 1 is a perspective view of a tire embodying our invention. Fig. 2 is an enlarged broken detail in side elevation, showing the inner structure thereof. Fig. 3 is a vertical transverse section thereof, also enlarged. Fig. 4 illustrates the method of making the tread-surface material.

Referring more particularly to Figs. 2 and 3, it will be seen that our tire is built up in layers $a$ $a'$ $a^2$ $a^3$, there being as many of these layers as desired for the particular purpose in hand.

We do not herein claim the building up of a tire in layers as our invention, inasmuch as tires have been commonly built in this manner before; but the previous tires have usually been composed of canvas or other cotton or linen strands or cloth, which make a heavy stiff tube which is lacking in resiliency, being dead, liable to puncture, and relatively short-lived.

By the term "dead" we mean that when one of the usual tires is compressed by meeting with an obstruction the tire itself does not tend to recover its original shape; but said recovery is entirely due to the pressure of the air within the tire, so that when a tire becomes punctured it collapses and flattens out around the felly.

We have succeeded in producing a tire which is self-resilient, or, in other words, the tube itself is inherently resilient independently of the air contained therein, so that when depressed the tire itself gives a back spring or self-recovery, which materially impresses the tire and makes it speedier. We accomplish this by embedding a layer of horsehair-cloth in rubber, so that the horsehairs thereof are held fixedly in position, and vulcanize the two together, whereby the warp is tenaciously gripped by the rubber, and the horsehairs are also permanently held against independent movement excepting that due to the flexing of the rubber. The fabric thus compounded is cut in strips or otherwise fashioned as desired and laid in successive layers $a$ $a'$ $a^2$, &c., as many as required, these layers preferably having the horsehairs extended in different directions, as shown clearly in Fig. 2, where it will be seen that the layer $a$ extends diagonally of the tire in one direction and the layer $a'$ diagonally in the opposite direction, the layer $a^2$ extending transversely of the tire and the layer $a^3$ longitudinally of the tire, and then the several layers are vulcanized together, making a practically one-piece tire. This is clearly shown in Fig. 3, said figure, however, showing the tire as relatively much thicker than is necessary in practice, for the reason that the hard bony material of the haircloth not only makes the tire superior, but enables us to make it much thinner than heretofore.

A tire constructed as above described is also much less liable to puncture than those heretofore provided.

Moreover, our tires are exceedingly tough and strong, the binding action of the rubber and horsehairs, vulcanized as they are, giving an exceedingly permanent and elastic combination.

A further important feature of our invention resides in the tread.

Referring to Fig. 3, it will be seen that we provide a tread $a^4$, having a nappy surface, which catches by means of its multitudinous and thickly-set prick-like ends against the pavement and positively prevents slipping. This tread is made by vulcanizing together a large number of layers of horsehair-cloth and rubber into a block-like or other solid form—such, for example, as shown in Fig. 4—and then shaving off a thin layer transversely of the hairs, (and preferably at right angles thereto, as indicated in Fig. 4, although it will be understood that this cut may be made obliquely, if preferred,) as indicated at $a^{10}$. This shaving is then vulcanized to and preferably slightly embedded in the outer or tread portion of the tire, as shown best in Fig. 3.

We have found that in use the rubber, which acts as a binder and vehicle for the short hairs of the tread, wears down just enough to leave the extreme points of the hairs jutting out in stub-like form, substantially as indicated in Fig. 3.

The hairs are practically indestructible, being also firmly locked in position by the bend or kink formed therein by the warps of the hair seating or cloth.

This tread is so nearly smooth that it does not pick up the mud, and yet it presents a permanently rough surface, feeling somewhat like sandpaper to the hand, being at the same time hard and possessing excellent wearing qualities.

While we have referred our description above to a bicycle-tire, we wish it understood that our invention is not limited thereto, but is intended to include any kind of tubing or hose and that the surface $a^4$ is not restricted to the tread-surface of a bicycle-tire, but that we claim it as a novel surface designed for use wherever it is desired to provide a gripping or teazle-like action, such as we have described above, (as in napping cloth,) as for cloth-napping machines, soles of running-shoes, &c.

Having fully described our invention, what we claim, and desire to secure by Letters Patent, is—

1. In a device of the kind described, a tube having one or more layers of horsehair fabric embedded in rubber and vulcanized therein, and an outside layer vulcanized on said tube and consisting of a multitude of short sections of horsehair standing endwise radially at the surface of the tube, substantially as described.

2. The combination with a tube, of a surface therefor, composed of a layer vulcanized on said tube and consisting of a multitude of short sections of horsehair standing endwise radially at the surface of the tube, substantially as described.

3. The herein-described surface fabric, consisting of a relatively thin sheet or strip of rubber having a multitude of short sections of horsehair standing endwise transversely of the sheet or strip with their ends terminating in the surface of said sheet or strip, substantially as described.

4. The combination with a suitable backing, of a fabric secured thereto and composed of rubber and horsehairs vulcanized together, the horsehairs being in short sections extended transversely of the fabric with their ends constituting the exposed surface, substantially as described.

In testimony whereof we have signed our names to this specification in the presence of the subscribing witnesses.

MATTHEW PRIOR.
THOS. W. PRIOR.

Witnesses to signature of Matthew Prior:
GEO. H. MAXWELL,
MABEL PARTELOW.

Witnesses to signature of T. W. Prior:
CHARLES L. LOCKWOOD,
WM. P. LANDIS.